United States Patent
Harter et al.

(10) Patent No.: US 10,013,481 B2
(45) Date of Patent: *Jul. 3, 2018

(54) USING A GRAPH DATABASE TO MATCH ENTITIES BY EVALUATING BOOLEAN EXPRESSIONS

(71) Applicant: RESEARCH NOW GROUP, INC., Plano, TX (US)

(72) Inventors: James Sterling Shapiro Harter, Lantana, TX (US); Eric Steven Herfield, Plano, TX (US); Nicholas Alexander Stuart, Frisco, TX (US); Nien-Chung Lee, Garland, TX (US); Stephen Allen Myers, Dallas, TX (US); Jeremy Scott Antoniuk, Allen, TX (US); Melanie Denise Courtright, Rowlett, TX (US); Daren Moneta, Dallas, TX (US); Peter David Flower, London (GB)

(73) Assignee: Research Now Group, Inc., Plano, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/202,121

(22) Filed: Jul. 5, 2016

(65) Prior Publication Data
US 2016/0314196 A1    Oct. 27, 2016

Related U.S. Application Data

(63) Continuation-in-part of application No. 13/733,069, filed on Jan. 2, 2013, now Pat. No. 9,390,195.

(51) Int. Cl.
*G06F 17/30* (2006.01)
*G06Q 30/02* (2012.01)

(52) U.S. Cl.
CPC .. *G06F 17/30678* (2013.01); *G06F 17/30533* (2013.01); *G06F 17/30587* (2013.01); *G06F 17/30958* (2013.01); *G06Q 30/0201* (2013.01)

(58) Field of Classification Search
CPC .......... G06F 17/3089; G06F 17/30575; G06F 17/2247; G06F 17/30861; G06F 17/227;
(Continued)

(56) References Cited

U.S. PATENT DOCUMENTS

| 6,182,058 B1 | 1/2001 | Kohavi |
| 6,236,978 B1 | 5/2001 | Tuzhilin |

(Continued)

FOREIGN PATENT DOCUMENTS

| WO | 2001/033831 | 5/2001 |
| WO | 2010/018584 | 2/2010 |

OTHER PUBLICATIONS

Yiping Ke, "Correlation Search in Graph Databases", Department of Computer Science and Engineering, The Hong Kong University of Science and Technology, Clear Water Bay, Kowloon, Aug. 12-15, 2007, 10 pages.

(Continued)

*Primary Examiner* — Angelica Ruiz
(74) *Attorney, Agent, or Firm* — Baker & McKenzie LLP

(57) ABSTRACT

A method of matching a first entity to a second entity by evaluating Boolean expressions includes identifying a set of criteria vertices for a second entity vertex by traversing a graph database in a manner constrained to fact vertices identified for the second entity. The graph database relates fact vertices to the criteria vertices by edges corresponding to Boolean expressions for satisfying criteria for matching first entities to second entities. The method additionally includes selecting one of the first entities based on the criteria vertices of the set. The method further includes (Continued)

matching the first entity to the second entity based on the selection.

54 Claims, 9 Drawing Sheets

(58) Field of Classification Search
CPC .......... G06F 17/30011; G06F 17/3002; G06F 17/30038; G06F 17/30533; G06F 17/30589; G06F 17/30595; G06F 17/30722; G06F 17/30958
See application file for complete search history.

(56) References Cited

U.S. PATENT DOCUMENTS

| | | |
|---|---|---|
| 6,616,458 B1 | 9/2003 | Walker et al. |
| 6,714,917 B1 | 3/2004 | Eldering et al. |
| 6,778,807 B1 | 8/2004 | Martino et al. |
| 6,839,730 B1 | 1/2005 | Ramabhadran |
| 6,999,987 B1 | 2/2006 | Billingsley et al. |
| 7,010,497 B1 | 3/2006 | Nyhan et al. |
| 7,269,570 B2 | 9/2007 | Krotki |
| 7,398,223 B2 | 7/2008 | Kahlert et al. |
| 7,672,911 B2 | 3/2010 | Owechko et al. |
| 7,720,707 B1 | 5/2010 | Mowry |
| 7,831,534 B2 | 11/2010 | Babikov et al. |
| 7,996,255 B1 | 8/2011 | Shenoy et al. |
| 8,099,311 B2 | 1/2012 | La Vecchia et al. |
| 8,103,537 B2 | 1/2012 | Chickering et al. |
| 8,170,906 B2 | 5/2012 | Von Schweber et al. |
| 8,635,099 B1 | 1/2014 | Floyd et al. |
| 2001/0049621 A1 | 12/2001 | Raposo |
| 2002/0022988 A1 | 2/2002 | Columbus et al. |
| 2002/0035568 A1 | 3/2002 | Benthin et al. |
| 2002/0128898 A1 | 9/2002 | Smith, Jr. et al. |
| 2003/0050915 A1 | 3/2003 | Allemang et al. |
| 2003/0204437 A1 | 10/2003 | Flender et al. |
| 2004/0181448 A1 | 9/2004 | Hartsman et al. |
| 2004/0236623 A1 | 11/2004 | Gopalakrishnan |
| 2005/0071219 A1 | 3/2005 | Kahlert et al. |
| 2005/0075919 A1 | 4/2005 | Kim |
| 2006/0212341 A1 | 9/2006 | Powers |
| 2006/0253418 A1 | 11/2006 | Charnock et al. |
| 2006/0288845 A1 | 12/2006 | Gale |
| 2007/0050256 A1 | 3/2007 | Walker et al. |
| 2007/0233571 A1 | 10/2007 | Eldering et al. |
| 2008/0104032 A1 | 5/2008 | Sarkar |
| 2008/0209431 A1 | 8/2008 | La Vecchia et al. |
| 2008/0281801 A1 | 11/2008 | Larson et al. |
| 2009/0055249 A1 | 2/2009 | Lieberman |
| 2009/0132345 A1 | 5/2009 | Meyssami et al. |
| 2009/0157482 A1 | 6/2009 | Jung et al. |
| 2009/0198568 A1 | 8/2009 | Waingold |
| 2009/0210290 A1 | 8/2009 | Elliott et al. |
| 2009/0259525 A1 | 10/2009 | Harrington |
| 2010/0100418 A1 | 4/2010 | Richter et al. |
| 2010/0114666 A1 | 5/2010 | Brierley et al. |
| 2010/0241573 A1 | 9/2010 | Joa et al. |
| 2010/0241649 A1 | 9/2010 | Lewak et al. |
| 2011/0046992 A1 | 2/2011 | Erhard |
| 2011/0066464 A1 | 3/2011 | George |
| 2011/0145039 A1 | 6/2011 | McCarney et al. |
| 2011/0153390 A1 | 6/2011 | Harris |
| 2011/0208559 A1 | 8/2011 | Fontoura et al. |
| 2011/0238493 A1 | 9/2011 | Ghosh et al. |
| 2011/0307262 A1 | 12/2011 | Messer et al. |
| 2012/0005029 A1 | 1/2012 | Lang et al. |
| 2012/0053991 A1 | 3/2012 | Shimizu et al. |
| 2012/0059844 A1 | 3/2012 | Senjalia |
| 2012/0059861 A1 | 3/2012 | Senjalia |
| 2012/0072261 A1 | 3/2012 | Oberoi et al. |
| 2012/0253891 A1 | 10/2012 | Hayes et al. |
| 2012/0278123 A1 | 11/2012 | Houle |
| 2013/0073502 A1 | 3/2013 | Golan et al. |
| 2013/0091162 A1 | 4/2013 | Lewak |
| 2014/0089049 A1 | 3/2014 | Cristofaro |
| 2014/0136553 A1 | 5/2014 | Jacob et al. |

OTHER PUBLICATIONS

International Search Report and Written Opinion issued for PCT/US2014/010082, dated Apr. 23, 2014, 14 pages.
International Search Report and Written Opinion issued for PCT/US2014/010077, dated May 27, 2014, 10 pages.
International Search Report issued for PCT/US2014/010088, dated Aug. 22, 2014, 2 pages.

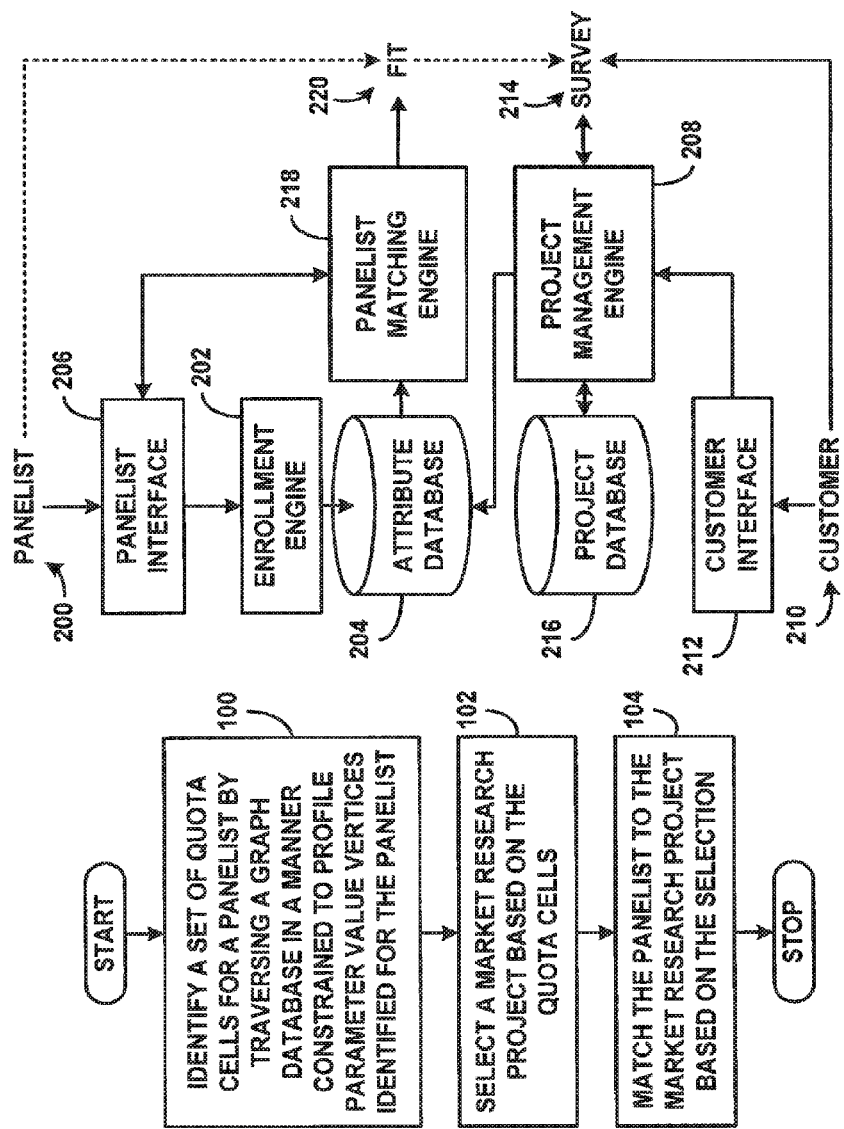

USING A GRAPH DATABASE TO MATCH ENTITIES BY EVALUATING BOOLEAN EXPRESSIONS

CROSS-REFERENCE TO RELATED APPLICATIONS

This application is a continuation-in-part of U.S. application Ser. No. 13/733,069, published as US 2014/0188941, titled "Using a Graph Database to Match Entities by Evaluating Boolean Expressions," the entirety of which is incorporated by reference herein for all purposes.

TECHNICAL FIELD

This disclosure is generally directed to matching entities. This disclosure is specifically directed to using a graph database to match entities by evaluating Boolean expressions.

BACKGROUND

Market research is an organized effort to gather information about markets or customers. Market research can include social and opinion research performed to systematically gather and interpret information about individuals or organizations using statistical and analytical methods and techniques of the applied social sciences to gain insight or support decision making. Viewed as an important component of business strategy, market research can be a key factor to obtain advantage over competitors. Market research provides important information to identify and analyze market need, market size, and competition.

Quantitative marketing research is the application of quantitative research techniques to the field of marketing. It has roots in both the positivist view of the world, and the modern marketing viewpoint that marketing is an interactive process in which both the buyer and seller reach a satisfying agreement on the "four Ps" of marketing: Product, Price, Place (location), and Promotion. As a social research method, it typically involves the construction of questionnaires and scales. People who respond (respondents) are asked to complete the survey. Marketers use the information so obtained to understand the needs of individuals in the marketplace, and to create strategies and marketing plans.

In market research, projects are defined for supplying a market research sample to a customer having a survey that needs to be completed by panelists having certain targeted attributes. Generally speaking, a project has a deadline for survey completion, and a set of criteria to fulfill in terms of the targeted attributes. An example target attribute for a survey might be "includes owners of vehicle model X," thus defining a requirement that 100% of panelists have this attribute. Another example target attribute for a survey might be "excludes drivers over age 40," thus defining a requirement that 0% of panelists have the attribute of being a driver over age 40.

On the other hand, other criteria for a project may involve quotas for certain demographics, such as 45%-55% male and 45%-55% female. These demographic quotas help prevent skew in the results, and are grouped together. For example, the aforementioned set of demographics defines a quota group for the project, with the % male and % female panelists each being a quota cell in that quota group. Another quota group might be defined as 45%-55% eastern US residents and 45%-55% western US residents. These quota groups may be independent of one another, in which case the customer does not mind if 100% of the male respondents are from the Eastern US, etc. Alternatively, the quota cells of a group may be "nested" (AKA "interlocked"), in which case two groups each having two quota cells may be replaced by a single quota group having four nested quota cells as follows: 22.5%-27.5% male, eastern US residents; 22.5%-27.5% female, eastern US residents; 22.5%-27.5% male, western US residents; 22.5%-27.5% female, western US residents. A project may have multiple quota groups, some of which may have quota cells nested therein.

The task of supplying the sample for a project has previously been addressed by using a relational database to find panelists having attribute values that match the values of the targeted attributes of a project. In this sense, panelists may be potential respondents who have enrolled as panelists and therefore have one or more of their attribute values recorded in the relational database. It is envisioned that panelists may be members of one or more proprietary market research access panels, or may have been sourced elsewhere, such as dynamically sourced through a network of website properties or from a third party access panel. It is also envisioned that panelists may be newly enrolling or not yet enrolled panelists. For a particular project, the panelists having the attribute values are then sent emails that provide a link to a survey associated with that project. A panelist may respond to such an email after that panelist is no longer needed for that project. In the past, such a panelist may then be matched to another project having a high acceptance rate, in the same or similar way that newly enrolled panelists are handled. However, it would be advantageous to match return panelists or newly enrolled panelists to projects having relatively low acceptance rates, thus making more effective use of the panelists. It would also be advantageous to make more efficient use of panelists who fail to qualify for a survey by rerouting such panelists to another survey. The present disclosure is directed toward providing such a solution.

BRIEF SUMMARY

In some aspects, a method of matching a first entity to a second entity by evaluating Boolean expressions includes identifying a set of criteria vertices for a second entity vertex by traversing a graph database in a manner constrained to fact vertices identified for the second entity. The graph database relates fact vertices to the criteria vertices by edges corresponding to Boolean expressions for satisfying criteria for matching first entities to second entities. The method additionally includes selecting one of the first entities based on the criteria vertices of the set. The method further includes matching the first entity to the second entity based on the selection.

In other aspects, an apparatus for matching a first entity to a second entity by evaluating Boolean expressions includes means for identifying a set of criteria vertices for a second entity vertex by traversing a graph database in a manner constrained to fact vertices identified for the second entity. The graph database relates fact vertices to the criteria vertices by edges corresponding to Boolean expressions for satisfying criteria for matching first entities to second entities. The apparatus additionally includes means for selecting one of the first entities based on the criteria vertices of the set. The apparatus further includes means for matching the first entity to the second entity based on the selection.

In additional aspects, a computer program product includes a non-transitory computer-readable medium. For example, the non-transitory computer-readable medium includes code for identifying a set of criteria vertices for a second entity vertex by traversing a graph database in a manner constrained to fact vertices identified for the second entities. The graph database relates fact vertices to the criteria vertices by edges corresponding to Boolean expressions for satisfying criteria for matching first entities to second entities. Additionally, the non-transitory computer-readable medium includes code for selecting one of the first entities based on the criteria vertices of the set. Also, the non-transitory computer-readable medium includes code for matching the first entity to the second entity based on the selection.

In further aspects, an apparatus for matching a first entity to a second entity by evaluating Boolean expressions includes a memory that stores a graph database relating fact vertices to criteria vertices by edges corresponding to Boolean expressions for satisfying criteria for matching first entities to second entities. The apparatus additionally includes a processor configured to identify a set of criteria vertices for a second entity vertex by traversing a graph database in a manner constrained to fact vertices identified for the second entity. The processor is also configured to select one of the first entities based on the criteria vertices of the set, and match the first entity to the second entity based on the selection.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying FIGURES, in which:

FIG. 1 is a flow diagram illustrating a method of matching a panelist to a market research project in accordance with the present disclosure;

FIG. 2 is a block diagram illustrating an apparatus for matching a panelist to a market research project in accordance with the present disclosure;

FIG. 9, including

DETAILED DESCRIPTION

Figure 3:
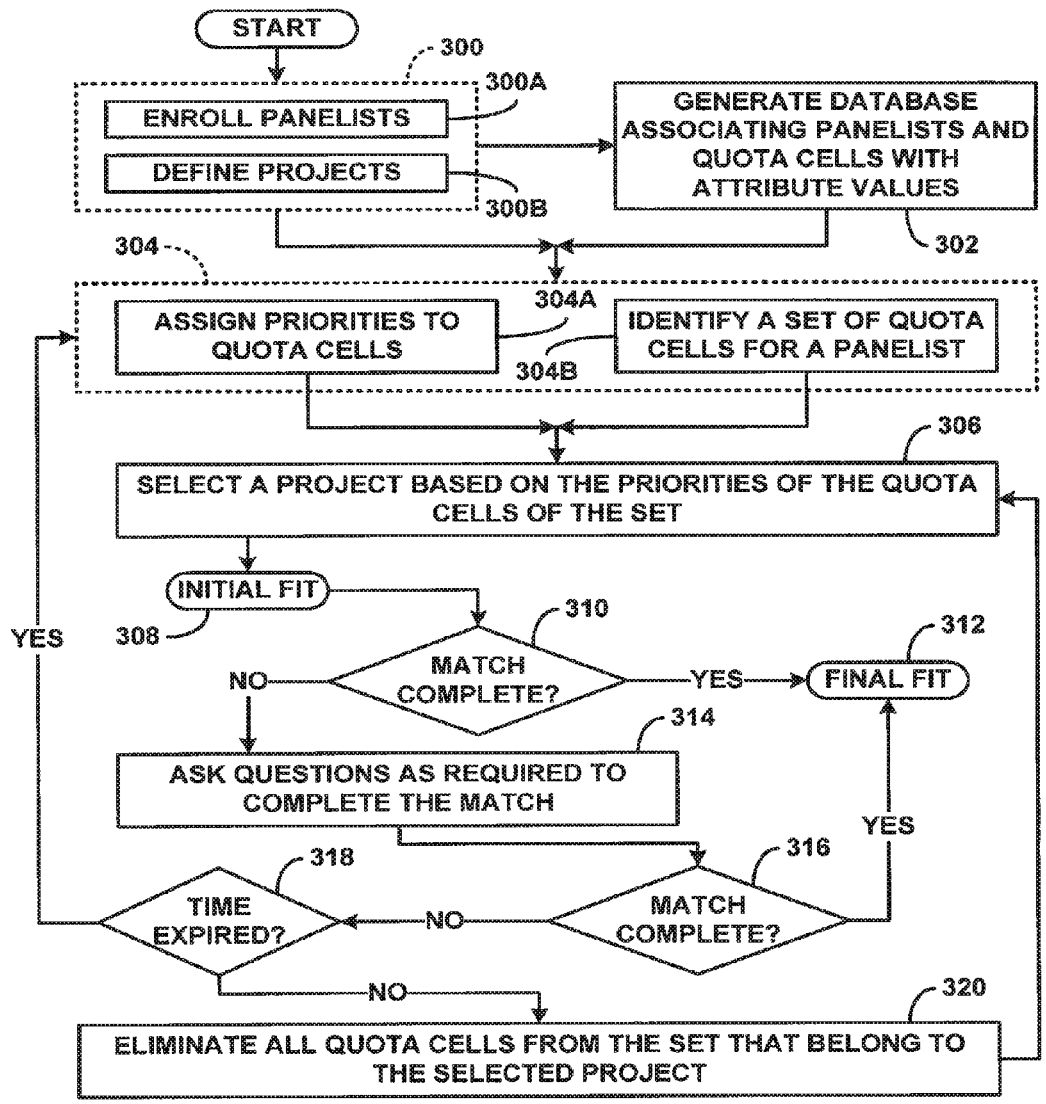
FIG. 3 is a flow diagram illustrating a method of operation for a market research apparatus in accordance with the present disclosure.

The inventive concept of the present disclosure utilizes a graph database to match entities having known facts to other entities, where the criteria for those matches may be various simple or complex Boolean expressions corresponding to each of those other entities. Advantageously, the graph database may determine facts identified for entities (e.g., consumers, panelists, etc.) and evaluate Boolean expressions for satisfying criteria for matching the such entities to other entities (e.g., goods, services, opportunities, etc.). Edges linking vertices for entities to vertices for facts identified for those entities permit rapid identification of those facts that have been identified for an entity. Includes type edges and excludes type edges linking fact vertices to vertices for the other entities permit evaluation of the criteria for matching the other entities. Advantageously, a query on an entity can identify only those facts that have been identified for an entity, and constrain evaluation of the criteria to only those criteria relating to those facts. Accordingly, evaluation of all of the criteria in the graph database that do not relate to any facts identified for the entity may be avoided. In this way, a more rapid query process may be carried out than could be accomplished with previous databases, such as relational databases, that would require evaluation of every set of criteria in the database. FIGS. 1, 2, and 3 represent systems in which the inventive concepts may be implemented.

In particular aspects described below with reference to FIGS. 1-9, an example implementation is set forth that addresses the task of matching a market research project to a panelist. For example, in these aspects, a first data item represents a first entity corresponding to a market research project, and a second data item is a second entity vertex corresponding to a panelist vertex that represents a panelist as a second entity. Additionally, in these aspects, fact vertices are data items corresponding to profile parameter value vertices representing profile parameter values identified for the panelist. Also, in these aspects, a criteria data item corresponds to a criteria vertex that represents a quota cell of a market research project, wherein a quota cell sets out criteria (e.g., percentage of panelists must exhibit a certain set of profile parameter values).

It is envisioned that other implementations may address other tasks. For example, it is envisioned that other implementations may match medical patients to medications, treatments, and/or medical study opportunities. Additionally, it is envisioned that other implementations may match consumers to advertisements. Also, more generally, other implementations may match entities having known attributes to goods, services, or opportunities. One skilled in the art will readily apprehend how to extend the teachings of the present disclosure to these other implementations without undue experimentation.

Referring to FIG. 1, the inventive concepts may be implemented to provide a solution to the problem of matching return panelists or newly enrolled panelists to market research projects having relatively low acceptance rates, and of rerouting panelists who fail to qualify for one survey to another survey. Under the proposed solution, one or more computer processors may, at step 100, identify a set of quota cells for a panelist by traversing a graph database in a manner constrained to profile parameter value vertices identified for the panelist. The one or more computer processors may additionally, at step 102, select a market research project based on the quota cells. The one or more computers may also, at step 104, match the panelist to the market research project based on the selection.

As described with reference to FIG. 2, the proposed solution for matching panelists to projects may be implemented by one or more components of an apparatus for matching a panelist 200 to a market research project. Such an apparatus may implement an enrollment engine 202 that enrolls the panelists 200 in an attributes database 204 by collecting attribute values of the panelist via a panelist interface 206. The attributes database 204 may include a relational database as will be readily understood by one skilled in the art. The relational database may be used for running queries that are not as time sensitive as a panelist rerouting operation. The attributes database 204 includes a graph database that relates panelists to profile parameter value vertices by edges, and that relates profile parameter value vertices to quota cell vertices by edges corresponding to Boolean expressions for satisfying quota cell criteria. This graph database may be employed for running queries in rerouting operations. Enrollment engine 202 may create and/or edit panelist vertices and/or the edges relating panelist vertices to profile parameter value vertices. Example graph database implementations are described in greater detail below with reference to FIGS. 4-9.

The apparatus may additionally implement a project management engine 208 that interacts with a customer 210 via a customer interface 212 to obtain information about a survey 212 implemented by the customer. As will be readily understood by one skilled in the art, project management engine 208 may collect information about a project for supplying a sample for the survey, including targeted attributes, demographic quotas, and a link to the electronic survey 214 hosted at the customer's website. One or more data objects representing the project may be instantiated and maintained by project management engine 208 in projects database 216. Project management engine 208 may additionally create and/or edit entries in attribute database 204 to record, for example, the profile parameter value vertices, the quota cell vertices, and the edges corresponding to Boolean expressions for satisfying quota cell criteria.

Project management engine 208 may also assign priorities to quota cells of projects based on one or more conditions, such as: a scarcity/value proxy based on pricing of quota cells that reflects scarcity of panelists fulfilling the quota cell criteria; percentage of progress, which may be defined in terms of number of registered starts or completes for a quota cell, versus the total number of starts or completes scheduled to have been achieved according to a field schedule for filling that quota cell on or before the project completion deadline; and/or elapsed effective field time for completion of the project, with a factor being defined for use as a measure of priority based on percentage of completion. In this sense, effective field time may take into consideration the time of day, days of the week, etc. with respect to panelist behavior, and when panelists are more likely to be available. Such priority assignment is described in greater detail in co-pending U.S. patent application Ser. No. 13/733,075 (published as US2014/0188553) entitled Quota Cell Priority Determination to Match a Panelist to a Market Research Project and filed concurrently with the present application's parent application on Jan. 2, 2013. The disclosure of the aforementioned U.S. patent application is incorporated by reference herein in its entirety for any purpose. The disclosure of the aforementioned U.S. patent application is attached hereto as Appendix A. Appendix A forms part of the application. Any features of any embodiments described in Appendix A may be combined with each other or combined with any embodiments within the description and/or any other Appendices attached hereto.

The computer-implemented process of matching panelists to projects may principally be carried out by a panelist matching engine 218. The panelist matching engine 218 may interact with the panelist 200 via the panelist interface 206, and access the attribute database 204, to obtain a fit 220 that matches the panelist 200 to a quota cell that is part of a project associated with a survey 214. Accomplishing the fit 220 may result, for example, in the panelist 200 being redirected to a website of the customer 210 where the survey 214 is hosted.

Such matching of the panelist to a project is described in greater detail in co-pending U.S. patent application Ser. No. 13/733,082 (published as US2014/0188554) entitled Priority-Weighted Selection to Match a Panelist to a Market Research Project and filed concurrently with the present application's parent application on Jan. 2, 2013. The disclosure of the aforementioned U.S. patent application is incorporated by reference herein in its entirety for any purpose. The disclosure of the aforementioned U.S. patent application is attached hereto as Appendix B. Appendix B forms part of the application. Any features of any embodiments described in Appendix B may be combined with each other and/or combined with any embodiments within the description and/or any other Appendices attached hereto.

Turning now to FIG. 3, a method of operation for the market research apparatus may begin at step 300 by enrolling panelists at step 300A, and defining projects at step 300B. A database associating panelists and quota cells with attribute (i.e., profile parameter) values may be generated and/or updated at step 302. At step 304, priorities may be assigned to quota cells at step 304A, and a set of quota cells may be identified for a panelist at step 304B. At step 306, one of the market research projects may be selected based on the priorities of the quota cells identified for the panelist. This selection may result in an initial fit 308. However, it is possible, in some implementations, that the match is not a complete match.

An incomplete match may occur, for example, if no value for a profile parameter required by quota cell criteria has yet been recorded. Alternatively or additionally, an incomplete match may occur if a sufficient amount of time has passed since a previous identification for the profile parameter value was made for the identification to no longer be considered current (i.e., even if the same or another value for that parameter was previously identified). Further, an event based mechanism may be employed that enables an incomplete match to occur due to a recorded event in a panelist's life that would indicate that certain profile parameter values may no longer be current or correct. If it is determined, at step 310, that the match is complete, then the initial fit 308 may be considered a final fit 312. Otherwise, at step 314, questions may be asked as required to complete the match. Any identifications obtained at step 314 may be employed to dynamically update the panelist's profile. If it is determined, at step 316, that the match is now complete, then the result may be the final fit 312. Otherwise, processing may return to a previous step depending on whether a predetermined amount of time (e.g., 15 seconds) has passed since the set of quota cells was identified at step 304B. This predetermined amount of time may reflect a rate at which the quota cell priorities are updated. If it is determined, at step 318, that the time has expired, then processing may return to step 300 for a new set of quota cells having updated priorities to be identified for the panelist. Otherwise, at step 320, all of the quota cells belonging to the selected market research project may be eliminated from the set of quota cells, and processing may return to step 306 for selection of another quota cell from the remaining quota cells of the set.

Figure 4:
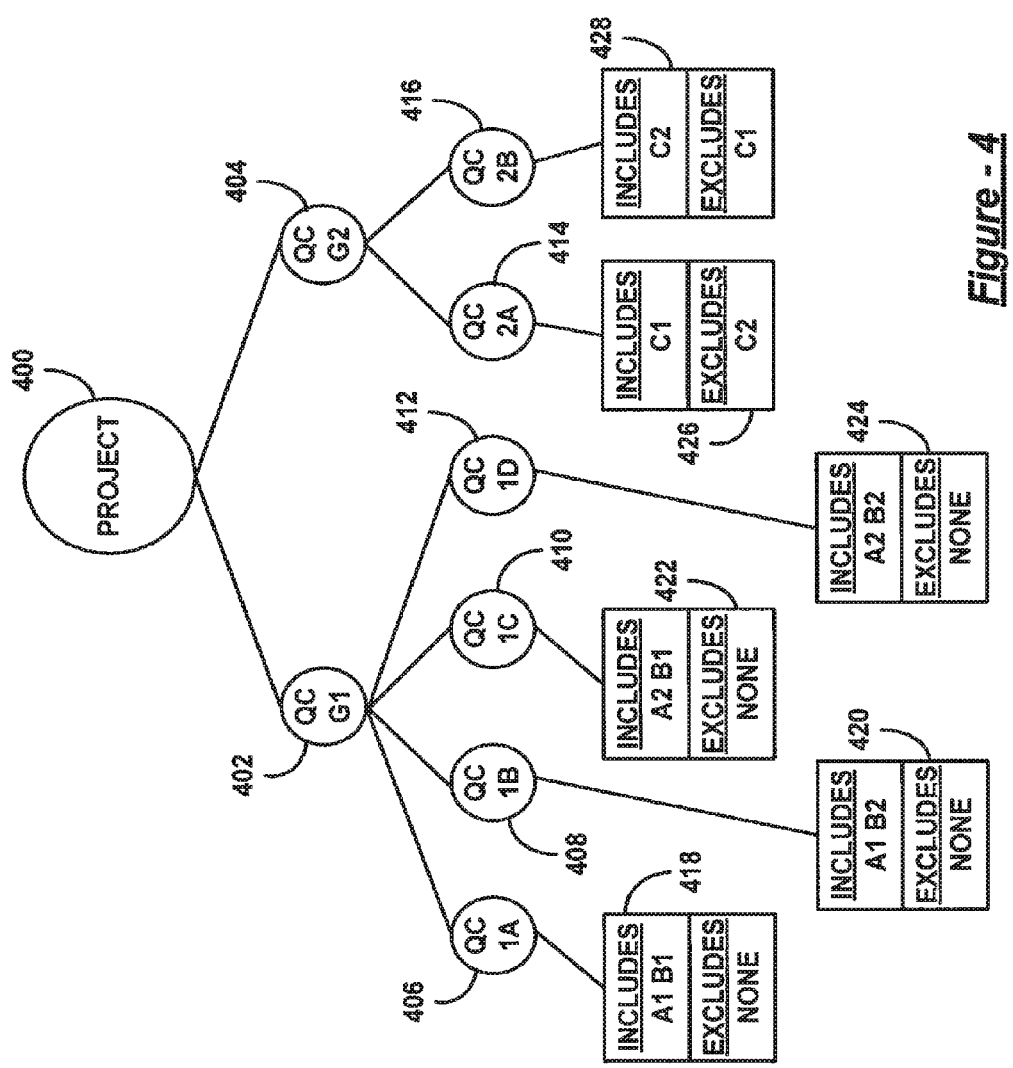
FIG. 4 is a block diagram illustrating a project having quota cells in accordance with the present disclosure.
Figure 5:
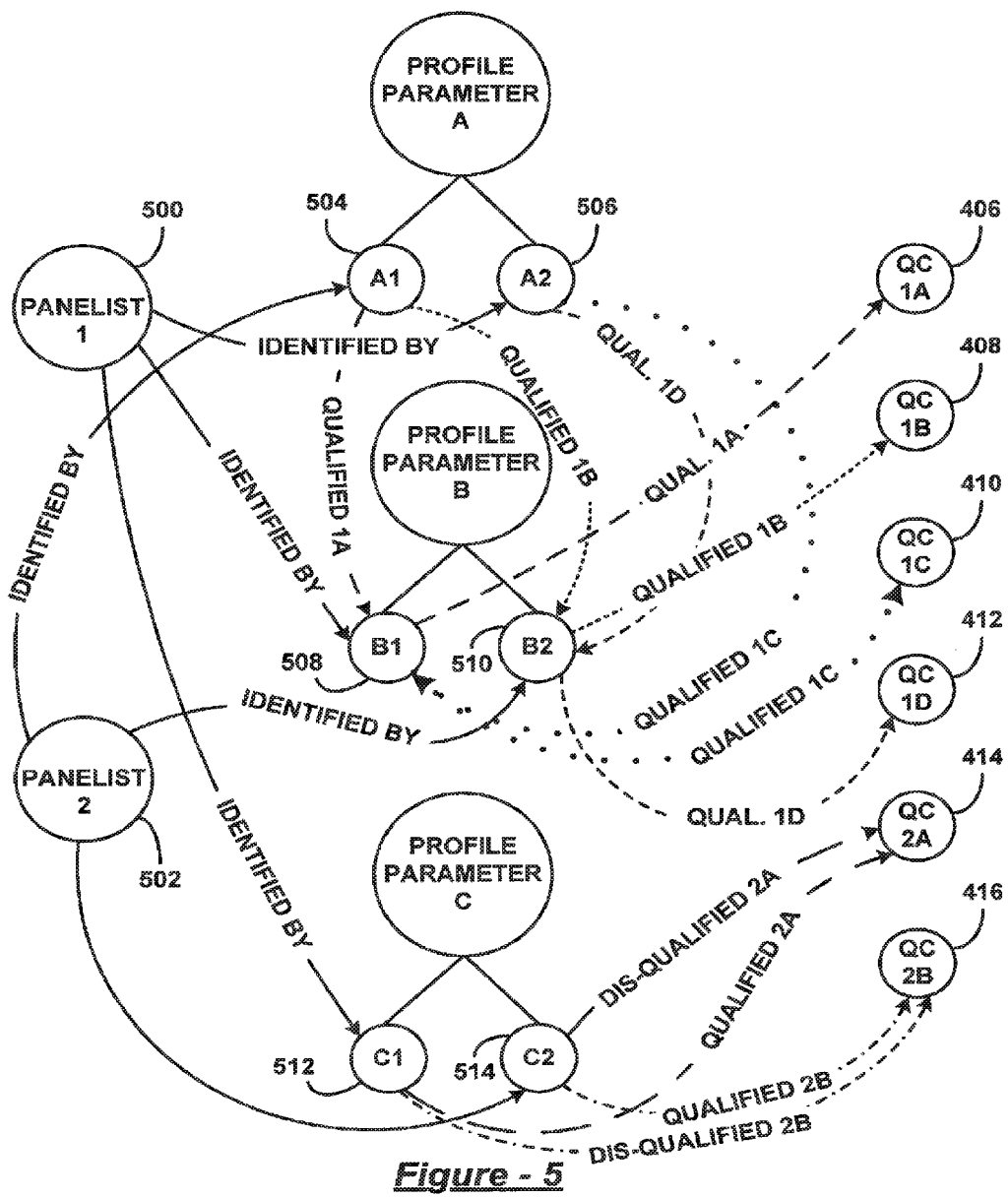
FIG. 5 is a block diagram illustrating an example of contents of a graph database in accordance with the present disclosure.
Figure 6:
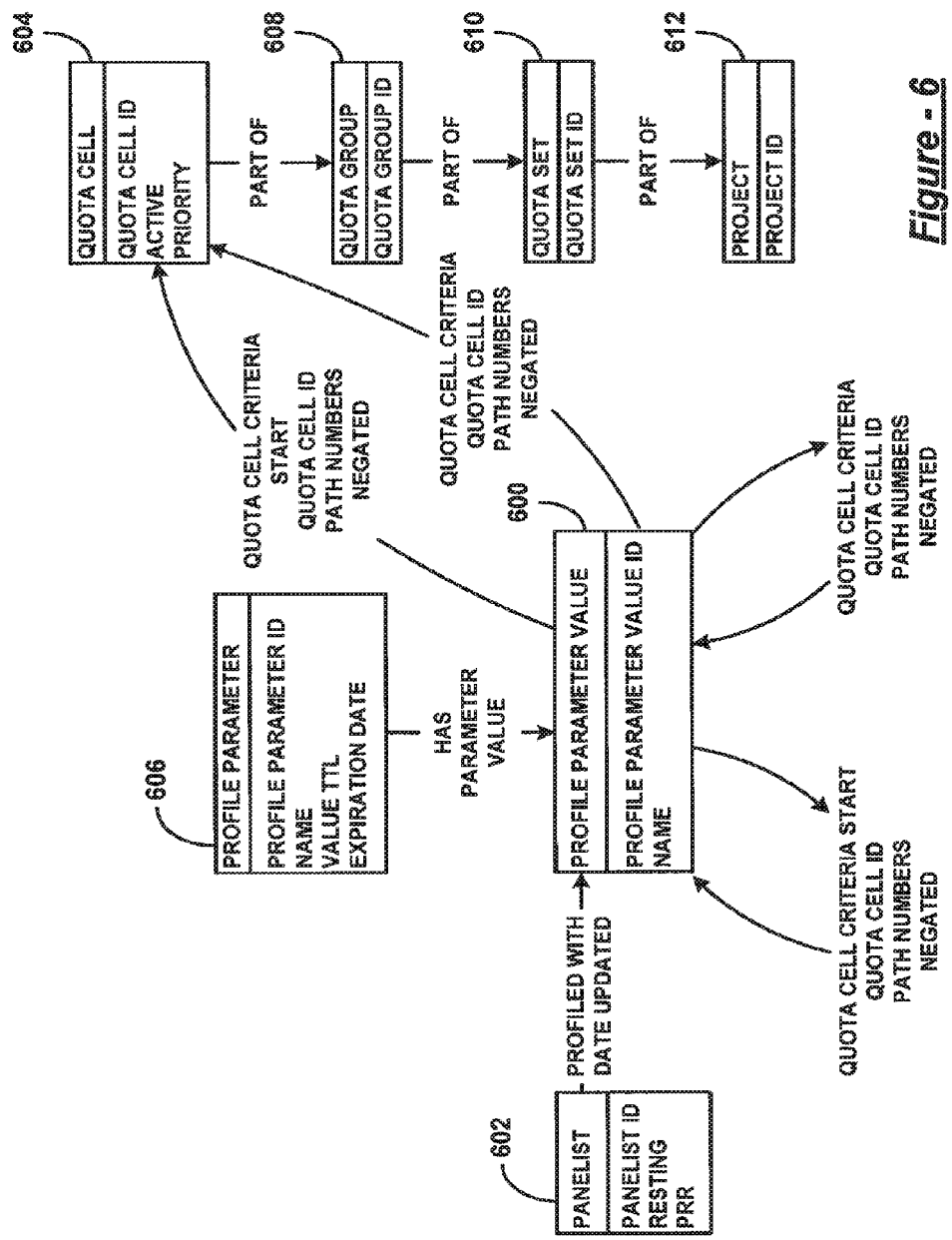
FIG. 6 is a block diagram illustrating an example of a graph database model in accordance with the present disclosure.
Figure 7:
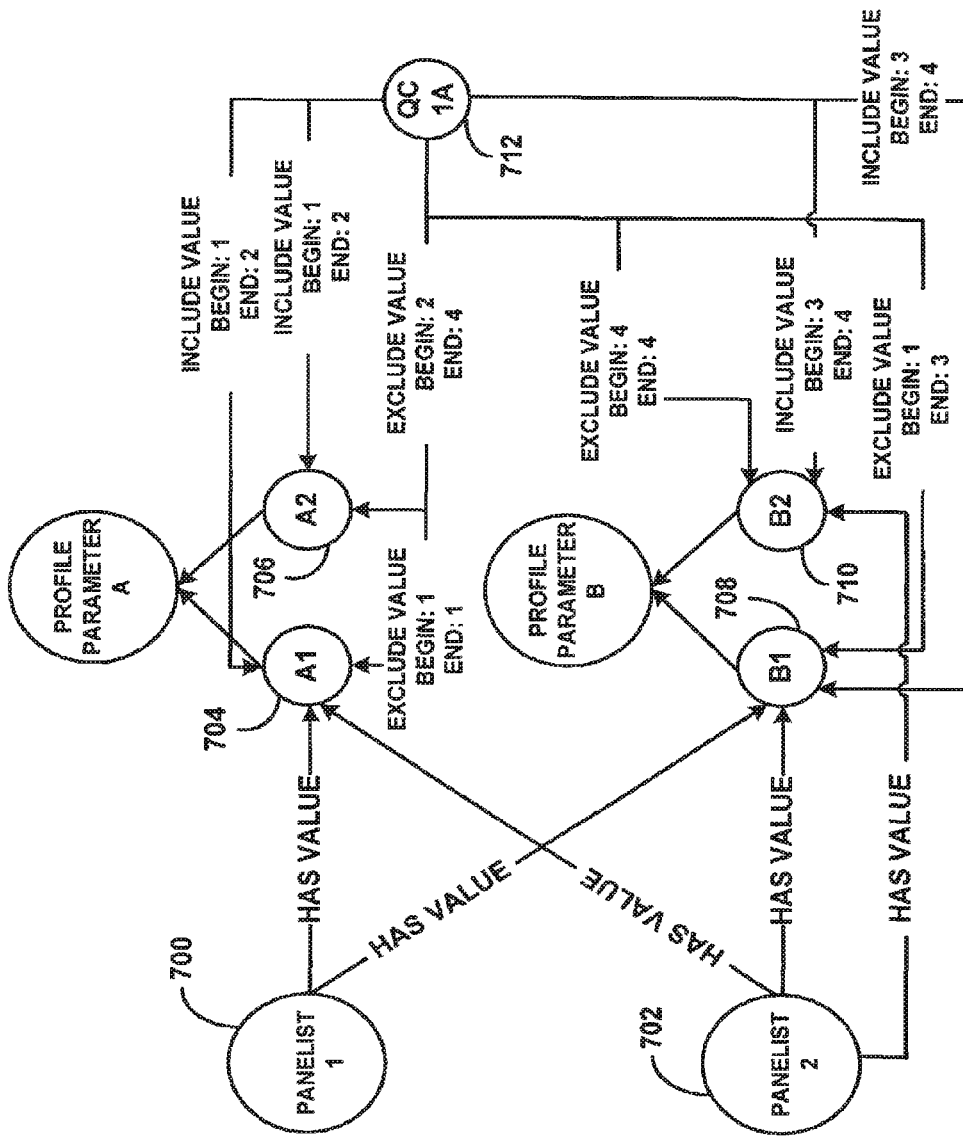
FIG. 7 is a block diagram illustrating another example of contents of a graph database in accordance with the present disclosure.
Figure 8:
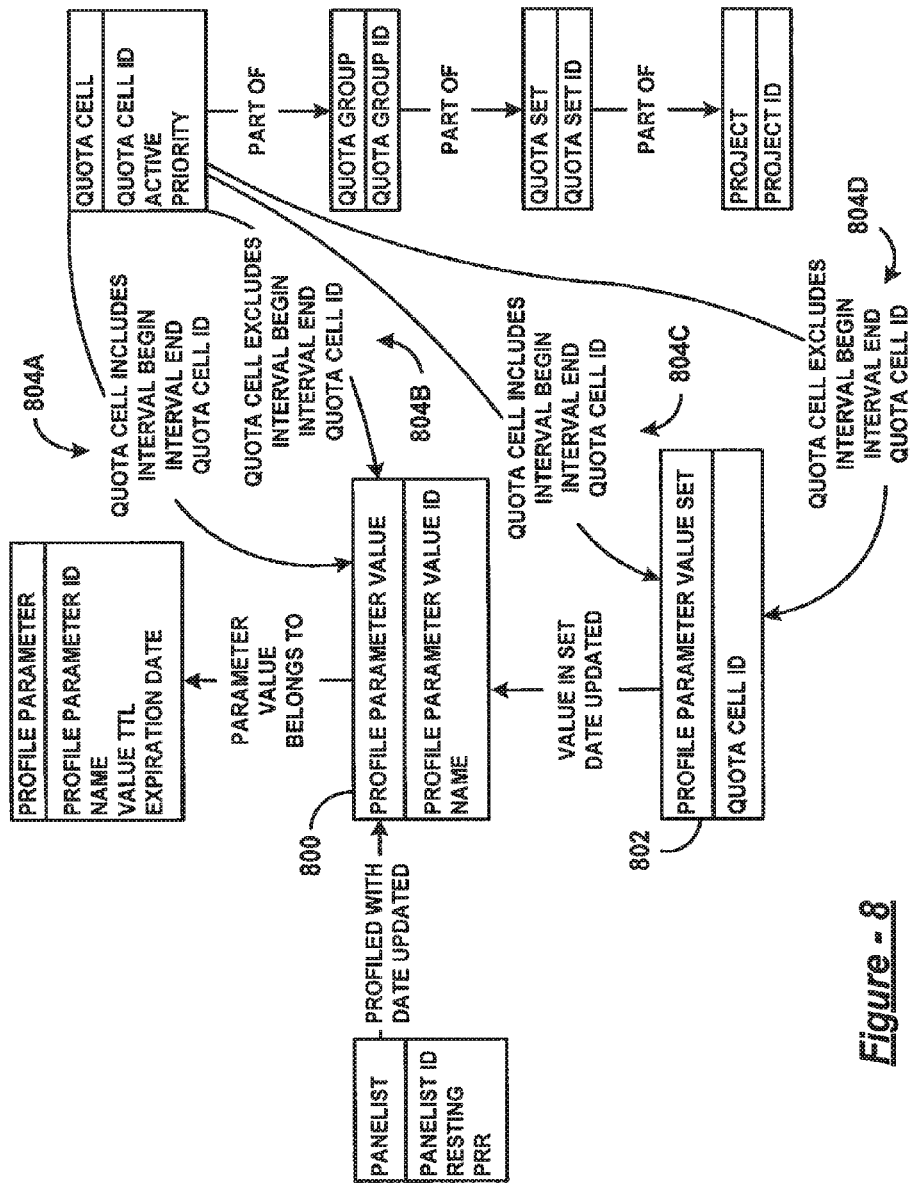
FIG. 8 is a block diagram illustrating another example of a graph database traversal model in accordance with the present disclosure.

Turning now to FIGS. 4-9, example graph database implementations will be described in greater detail. FIGS. 4-6 provide an example implementation for evaluating simple Boolean expressions according to one model, while FIGS. 7-9 provide another model that may also be used to evaluate Boolean expressions. Referring particularly to FIG. 4, an example project 400 has a pair of quota groups 402 and 404. Quota group 402 may include, for example, four quota cells 406, 408, 410, and 412 nesting two different parameters. On the other hand, quota group 404 may have, for example, two quota cells 414 and 416 for two values of a single parameter.

Quota cells 406-412 may represent, for example, combinations of profile parameter values, such as gender and age. Quota cell 406, for example, may correspond to males under age forty, whereas quota cell 408 may correspond to males over age forty. Similarly, quota cell 410 may correspond to females under age forty, whereas quota cell 412 may correspond to females over age forty. Accordingly, each of these quota cells 406-412 may have a set of Boolean criteria 418, 420, 422, and 424 defining the includes and excludes for the quota cell in terms of the corresponding profile parameter values.

Quota cells 414 and 416 may represent profile parameter values, such as citizenship. For example, quota cell 414 may correspond to United States citizenship, whereas quota cell 416 may correspond to Canadian citizenship. Accordingly, each of these quota cells 414 and 416 may also have a set of Boolean criteria defining the includes and excludes for the quota cell in terms of the relevant profile parameter values. In this example, panelists who are known to be United States citizens may be included by criteria 426, while panelists who are known to be Canadian Citizens may be included by criteria 428. Additionally, exclusions defined in criteria 426 and 428 may exclude panelists who are known to be citizens of both the United States and Canada. As will be further explored below, defining the exclusions in criteria 426 and 428 may enable elimination of projects for panelists who are who are known to be citizens of both the United States and Canada, while permitting an incomplete match to be made for those panelists for whom the one or more of the relevant citizenship statuses has not yet been determined.

Turning to FIG. 5, an example of graph database contents is provided for corresponding to that of the project of FIG. 4. Unlike a relational database router, the innovative graph search router disclosed herein uses a graph database in which panelist vertices 500 and 502 are related to profile parameter value vertices 504, 506, 508, 510, 512, and 514 by edges indicating which values have been identified for those panelists. For example, profile parameter value vertices 504 and 506 may represent gender, whereas vertices 508 and 510 may represent age below or above forty, and vertices 512 and 514 may represent product ownership and non-ownership, respectively. Many other types of profile parameter values that can be included in the database contents will be readily apparent to those skilled in the art.

The graph database contents also relate the profile parameter values 504-514 to the quota cell vertices 406-416 by edges corresponding to the quota cell criteria, and having a type, such as "includes" or "excludes." These edges capture both targeted attributes (i.e., "includes and "excludes" criteria) and quota cell criteria by defining simple and/or complex Boolean expressions for satisfying the criteria for a quota cell. For example, an "includes" type of edge encountering a set of profile parameter value vertices of the graph database, and extending to or from a quota cell, can define an "AND" expression for satisfying the "includes" criteria for that quota cell (e.g., "male" and "over age forty"). It should be readily understood that non-branching paths like those shown in FIG. 5 may represent Boolean "AND" expressions, whereas a branching path may additionally or alternatively be employed to represent Boolean "OR" expressions. Additionally, one or more edges of an "excludes" type defining one or more paths through profile parameter value vertices of the graph, to or from a quota cell vertex, may be employed to represent Boolean "ANDNOT" operations.

Turning now to FIG. 6, the graph database router can be implemented using classes and/or data objects to match a panelist to one or more quota cells by traversing edges of the graph data structure in a manner constrained to profile parameter value vertices 600 identified for a panelist, and thereby avoid considering many of the active quota cells during the routing process. For example, in order to match a panelist to a quota cell vertex 604, the router may first traverse edges from a panelist vertex 602 to all of the vertices 600 of the graph representing profile parameter values that have been identified for that panelist. The router may then determine whether any of those vertices 600 are included in paths defined by edges extending to or from quota cell vertices 604. The router may identify a set of quota cell vertices 604 each having at least one "includes" edge that encounters at least one of the identified parameter value vertices 600, and that do not have at least one "excludes" edge that encounters at least one of the identified parameter value vertices 600. From the identified quota cell vertices 604, the related quota groups 608, quota sets 610, and projects 612 can be determined. One skilled in the art will readily recognize many implementations of classes and/or data objects, and associated variables, that may be used to carry out the router as described above. A particular example of such classes and/or data objects, and associated variables, is provided in FIG. 6 as set forth below in TABLE 1.

TABLE 1

| Property | Data Type | Description |
| --- | --- | --- |
| panelistId | long | The system ID of the panelist. |
| resting | boolean | Indicates whether or not the panelist is resting (i.e. not available to take surveys right now). |

TABLE 1-continued

| Property | Data Type | Description |
| --- | --- | --- |
| prr | double | Personal Response Rate. |
| dateUpdated | long | When a particular profile value was last updated by the panelist/system, expressed as milliseconds since the epoch. |
| profileParameterId | int | The ID of the parameter from Respondent Profile Management. |
| name | string | The name of the parameter or parameter value from Respondent Profile Management. |
| profileParameterValueTTL | int | The length of time in days that a particular value is still considered valid for a panelist. Used in conjunction with dateUpdated |
| expirationDate | long | The date when the parameter and all its values should be removed from the system. Expressed as milliseconds since the epoch. |
| profileParameterValueId | long | The parameter value ID of the value from Respondent Profit Management. |
| quotaCellId | long | The ID of the quota cell from Quota Management. |
| pathNumbers | int[ ] | An array of path numbers associated with the quota cell that the edge is part of. |
| negated | boolean | Indicates that the vertex/vertex at the end of the edge should NOT be part of the panelist's profile. |
| active | boolean | A flag to indicate that a quota cell is currently active. If false, this quota cell should not be returned as a valid match. |
| priority | int/double | The priority of the quota cell as calculated by the priority calculator. |
| quotaGroupId | long | The ID of the quota group from Quota Management. |
| quotaSetId | long | The ID of the quota set from Quota Management |
| projectId | long | The ID of the project. |

As already mentioned above, the router may be able to make incomplete matches. For example, if an edge additionally encounters a vertex representing a value of a profile parameter not yet determined for the panelist, an "incomplete" match may be determined for that quota cell. Alternatively or additionally, an event-based mechanism may record an event that may indicate that certain values may have changed or may no longer be current. As indicated in the example described above, an "excludes" edge regarding other values for a parameter may prevent an incomplete match from being made where the other value has been identified for the panelist. In the alternative, a determination can be made whether any of the other profile parameter values for that profile parameter value have already been identified for the panelist, and the incomplete match may be conditioned on no other value having been recorded for the panelist. In either case, an incomplete match may be determined based on a profile parameter value being expired (i.e., a sufficient amount of time having passed for a previous identification for the profile parameter value identification to no longer be current), thus permitting an incomplete match even if the same or another value for that parameter was previously identified. Once the set of quota cells are identified for the panelists, an additional step may be carried out to determine whether all quota groups for a project are represented in the set. If not, then all quota cells associated with that project may be eliminated from the set, leaving in the set only quota cells associated with projects having all of their quota groups represented in the set.

Turning now to FIG. 7, another example of graph database contents provides for efficient handling of extremely complex Boolean expressions using a novel application of interval techniques discussed by M. Fontoura, S. Sadanandan, J. Shanmugasundaram, S. Vassilvitski, E. Vee, S. Venkatesan, and J. Zien. *Efficiently evaluating complex Boolean expressions*. In SIGMOD '10. In this case, panelist vertices 700 and 702 may be related to profile parameter value vertices 704, 706, 708, and 710 by "has value" edges. These "has value" edges are functionally the same as the "identified by" edges previously described with reference to FIG. 5. In this case, a quota cell vertex 712 may be related to the profile parameter value vertices 704-710 by edges that define intervals such as those set forth below:

Include BE: (A1 OR A2) AND (B1 OR B2)
Include Intervals:
A1: [1,2]
A2: [1,2]
B1: [3,4]
B2: [3,4]
Exclude BE: (A1 AND A2) OR (B1 AND B2)
Exclude Intervals:
A1: [1,1]
A2: [2,4]
B1: [1,3]
B2: [4,4]

Turning to FIG. 8, a router for traversing such graph database contents may have classes and/or data objects for traversing profile parameter value vertices 800 in profile parameter value sets 802 that are specific to particular quota cells IDs. The edges 804A-D may be provided using variables that define the beginnings and endings of intervals for the particular quota cell IDs. A method of operation for such a router is explored in detail below with respect to FIG. 9.

Figure 9A:
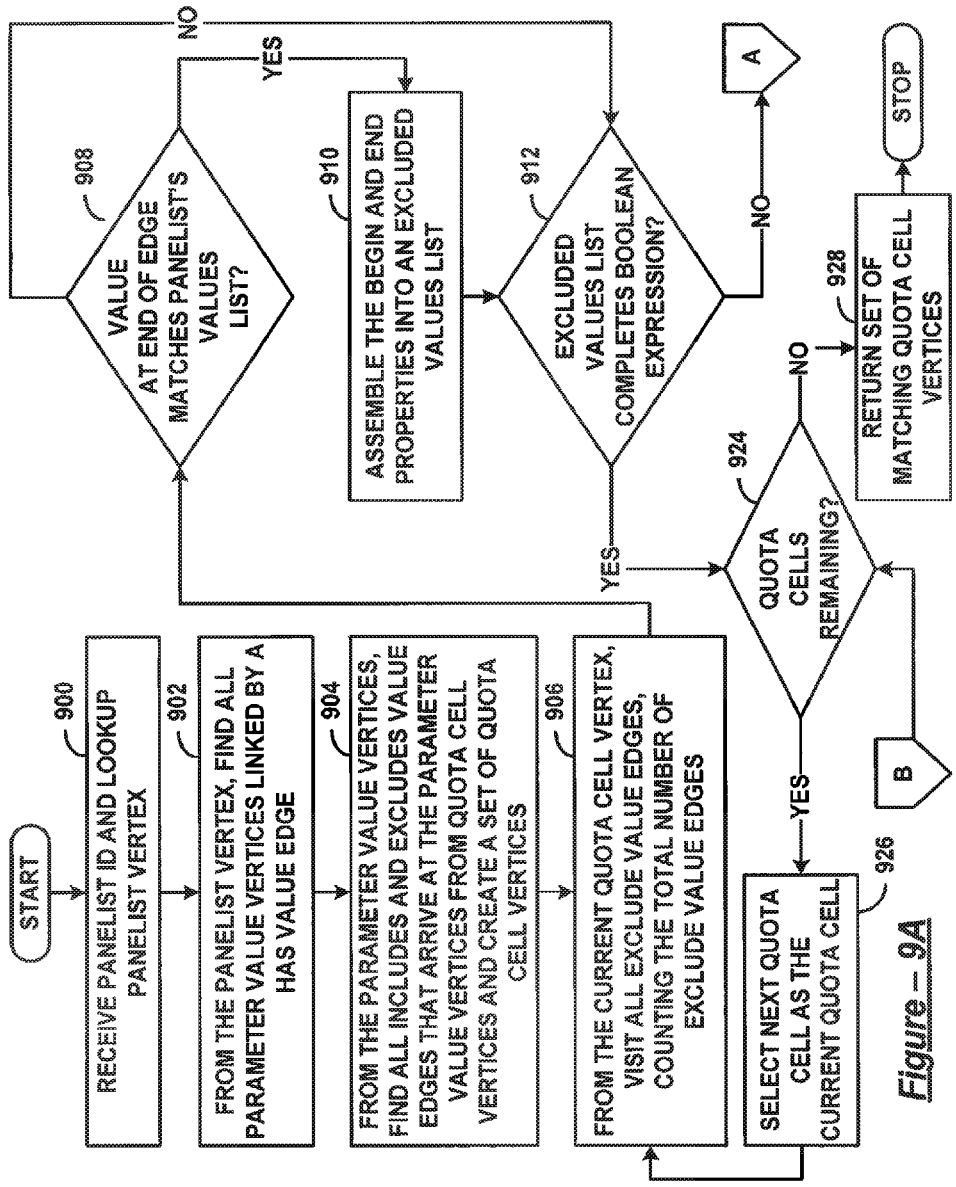
FIG. 9A and FIG. 9B, is a flow diagram illustrating a method of traversing a graph database in accordance with the present disclosure.
Figure 9B:
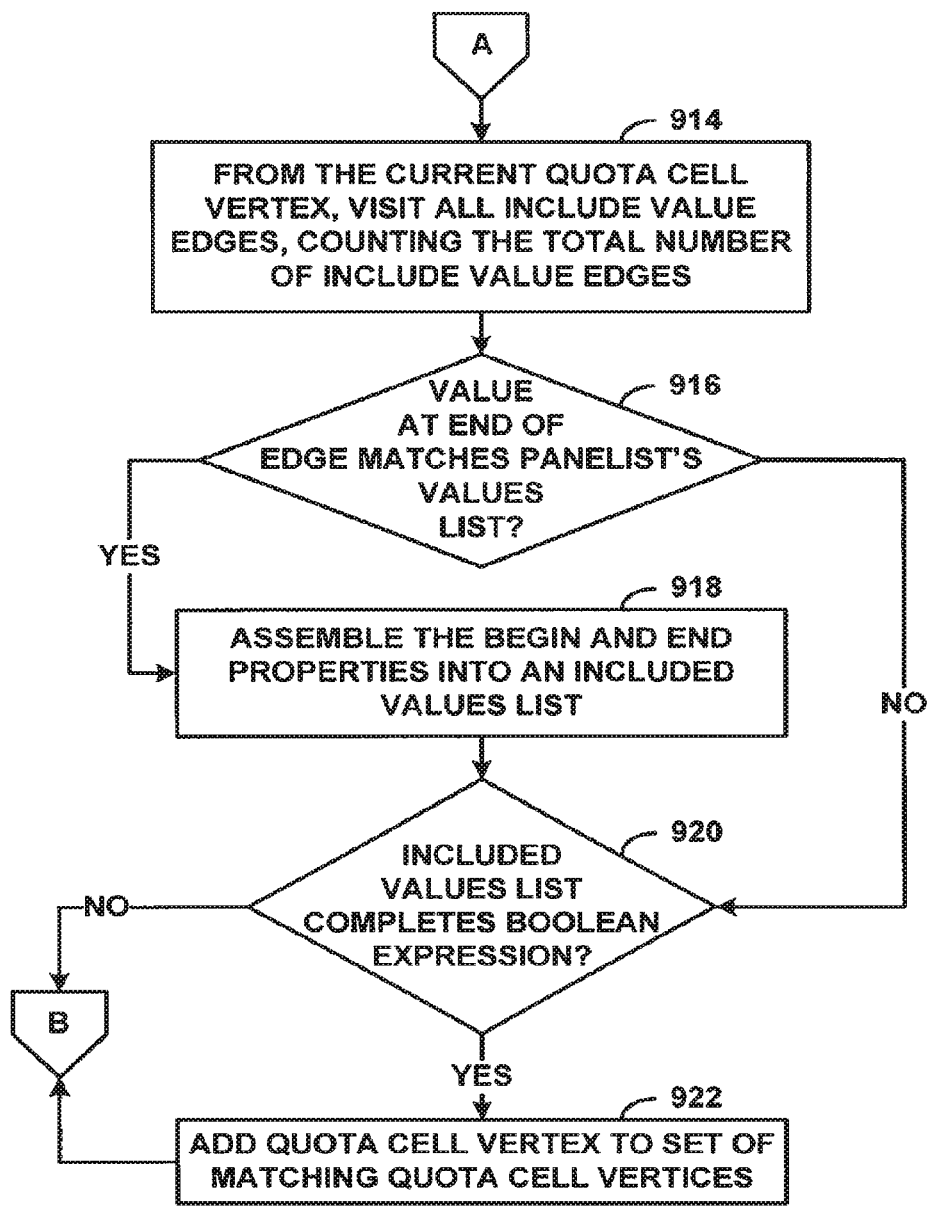

Turning now to FIG. 9 and referring generally to FIG. 9A and FIG. 9B, a method for handling complex Boolean expressions may respond, at step 900, to receipt of a panelist ID by looking up a corresponding panelist vertex in a graph database. At step 902, from the panelist vertex, all of the parameter value vertices linked thereto by "has value" edges may be found. At step 904, from the parameter value vertices, all of the includes and excludes value edges that arrive at the parameter value vertices from quota cell vertices may be found, and a set (e.g., list) of the quota cell vertices may be generated. At step 906, a first vertex of the set may be taken as a current quota cell vertex, and all "exclude" value edges may be visited from the current quota cell vertex. Visiting the "exclude" value edges at step 906 may include counting the total number of exclude value edges. At step 908, a determination may be made whether a value at an end of each "exclude" value edge matches a value from the list of profile parameter value vertices found for the panelist at step 902. If it is determined that there is match, then begin and end properties of the matching edges may be assembled into an excluded values list at step 910. Once the excluded values list is completed, it may be evaluated, at step 912, to determine whether the excluded values list completes the Boolean expression for the "excludes" criteria.

If the determination, at step 912, indicates that the "excludes" criteria are not satisfied, then a similar procedure may be carried out for the "includes" criteria. For example, at step 914, all of the "include" value edges may be visited form the quota cells, and the total number of "include" value edges may be counted. At step 916, a determination may be made whether a value at an end of each "include" value edge matches a value from the list of profile parameter value vertices found for the panelist at step 902. If it is determined that there is match, then begin and end properties of the matching edges may be assembled into an included values list at step 918. Once the included values list is completed, it may be evaluated, at step 920, to determine whether the included values list completes the Boolean expression for the "includes" criteria. If so, then the current quota cell may be added to a list of matching quota cells at step 922.

The evaluation of the current quota cell may be deemed completed in response to various conditions. For example, the evaluation may be deemed completed upon determination, at step 912, that the excluded values list completes the Boolean expression for the "excludes" criteria. Additionally, the evaluation may be deemed completed upon determination, at step 920, that the included values list does not complete the Boolean expression for the "includes" criteria. Also, the evaluation may be deemed completed upon addition, at step 922, of the current quota cell to the list of matching quota cells.

Once the evaluation of the current quota cell has been completed, then a determination may be made, at step 924, whether there are any unevaluated quota cells remaining in the set of quota cell vertices created in step 904. If so, then a next unevaluated quota cell of the set may be selected, at step 926, to be the current quota cell, and processing may return to a previous step, such as step 906. Otherwise, upon determination, at step 924, that all quota cells of the set have been evaluated, the list of matching quota cells may be returned at step 928. This list of matching quota cells may be the set of quota cells identified for the panelist.

As previously mentioned, once the set of quota cells are identified for the panelists, an additional step may be carried out to determine whether all quota groups for a project are represented in the set. If not, then all quota cells associated with that project may be eliminated from the set, leaving in the set only quota cells associated with projects having all of their quota groups represented in the set. One of the remaining quota cells may then be selected, and a match may be made of the panelist to the project associated with the selected quota cell.

In some embodiments, a method is provided for matching a first entity (e.g., a panelist) to a second entity (e.g., a project or a quota cell associated with a project) by evaluating Boolean expressions. The method comprises: accessing, using one more hardware computing processors, a graph database relating parameter values (e.g., profile parameter values) to quota cells; identifying, using one more hardware computing processors, a set of parameter values for a first entity; traversing, using one more hardware computing processors, the graph database based on the set of parameter values for the first entity; determining, using one more hardware computing processors, a first Boolean expression for satisfying criteria for the first quota cell; determining, using one more hardware computing processors, whether a first parameter value from the set of parameter values for the first entity matches a criteria for the first quota cell; in response to determining the first parameter value from the set of parameter values for the first entity matches the criteria for the first quota cell, determining, using one more hardware computing processors, whether the first Boolean expression is completed, or in response to determining the first parameter value from the set of parameter values for the first entity does not match the criteria for the first quota cell, not recording the first quota cell for the first entity; and in response to determining the first Boolean expression is not completed, determining, using one more hardware computing processors, whether the second parameter value from the set of parameter values for the first entity matches the criteria for the first quota cell, or in response to determining the first Boolean expression is completed, determining the first entity matches the first quota cell.

In some embodiments, the method further comprises determining a project for the first entity based on the matched first quota cell, or assigning the first entity to the project based on the matched first quota cell.

In some embodiments, the first entity comprises a panelist.

In some embodiments, the criteria comprises include criteria and exclude criteria.

In some embodiments, determining the first parameter value from the set of parameter values for the first entity matches include criteria for the first quota cell is executed separately from determining the first parameter value from the set of parameter values for the first entity matches exclude criteria for the first quota cell.

In some embodiments, the first quota cell is associated with a priority.

In some embodiments, the method further comprises assigning priorities to quota cells based on scarcity of quota cell criteria.

In some embodiments, the method further comprises assigning priorities to quota cells based on percentage of progress of projects.

In some embodiments, the method further comprises assigning priorities to quota cells based on elapsed effective field time for completion of the projects.

In some embodiments, the method further comprises assigning priorities to quota cells, wherein assigning priorities includes imposing limits on at least one of: a percentage of progress defined in terms of number of registered versus scheduled starts and/or completes for the quota cells, or a product of the percentage of progress and an effective field time factor that reflects an elapsed effective field time based on percentage of expiration of a predetermined amount of time for completing a particular project having the quota cell.

In some embodiments, assigning the priorities further includes summing a result of the imposing limits with a scarcity value reflecting a scarcity of the quota cell criteria.

In some embodiments, assigning the priorities further comprises scaling a result of the summing by a configurable tracker factor.

In some embodiments, assigning the priorities comprises computing a priority according to: Priority=(if $(450*(1.3-\text{Progress \%})^2 > 700$ then 700 else if $450*(1.3-\text{Progress \%})^2*(\text{EFT Factor}) < 0$ then 0 else $450*(1.3-\text{Progress \%})^2*(\text{EFT Factor}))+(\text{scarcity value proxy}))*(\text{Tracker factor})$.

In some embodiments, assigning the priorities based on the elapsed effective field time includes employing an effective field time factor that reflects an elapsed effective field time based on percentage of expiration of a predetermined amount of time for completing a particular project having the quota cell.

In some embodiments, assigning the priorities based on the percentage of progress includes employing a percentage of progress defined in terms of number of registered versus scheduled starts and/or completes for the quota cells.

In some embodiments, the method further comprises selecting a quota cell, wherein selecting the quota cell further comprises weighted random selection of the quota cells according to priorities assigned to the quota cells.

In some embodiments, the method further comprises determining the project by weighted random selection of projects according to priorities assigned to their respective quota cells identified for the first entity, wherein the first entity comprises a panelist.

In some embodiments, weighted random selection of projects according to the priorities assigned to their respective quota cells identified for the panelist includes associating the projects with segments of a segmented bell curve based on the priorities assigned to their respective quota cells identified for the panelist.

In some embodiments, weighted random selection of projects according to the priorities assigned to their respective quota cells identified for the panelist includes randomly selecting a segment of the bell curve.

In some embodiments, a segment associated with projects of higher priority than those of another segment has a greater chance of being selected than the other segment.

In some embodiments, weighted random selection of projects according to the priorities assigned to their respective quota cells identified for the panelist includes randomly selecting a project of the selected segment of the bell curve.

In some embodiments, the criteria comprises balancing criteria, wherein the balancing criteria is associated with balancing categories of first entities for a project, wherein in response to determining that parameter values associated with the first entity do not meet the balancing criteria, the first entity is not assigned to a project based on the matched first quota cell. For example, a quota cell for a project may include people over the age of 40. Balancing criteria for this quota cell or project may include maintaining a balance between males and females assigned to the project. Therefore, in some embodiments, there may be thresholds associated with the number or percentage of males or females assigned to a project. In such embodiments, even if a first entity (e.g., a panelist) meets the criteria of a quota cell (e.g., over the age of 40) of a project, the first entity may not be assigned to the project (or the project may not be determined for the first entity) because the first entity does not meet the balancing criteria (i.e., enough males or females have already been assigned to the project).

In some embodiments, the criteria comprises pacing criteria, wherein the pacing criteria comprises a threshold rate of filling a project, wherein in response to determining a current rate of filling the project is equal to or greater than the threshold rate, the first entity is not assigned to a project based on the matched first quota cell. For example, a quota cell or a project may be associated with a rate at which the project needs to be filled. For example, if the project seeks 500 panelists, the project may seek to be filled at a rate of 100 panelists per month. In such embodiments, assume that in the current month, the project has already been filled with 100 qualified panelists (i.e., panelists who match the quota cells for the project). In such embodiments, even if a first entity meets the criteria of a quota cell (e.g., over the age of 40) of a project, the first entity may not be assigned to the project (or the project may not be determined for the first entity) because the first entity does not meet the pacing criteria because 100 qualified panelists have already been determined for the current month.

In some embodiments, an apparatus may be provided for executing the various methods described herein. In some embodiments, a non-transitory computer readable medium that comprises code may be provided for executing the various methods described herein.

Although the present invention and its advantages have been described in detail, it should be understood that various changes, substitutions and alterations may be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for matching entities to quota cells by evaluating Boolean expressions, the method comprising:
   accessing, using one more computing device processors, a graph database relating parameter values to quota cells;
   identifying, using the one more computing device processors, a set of parameter values for a first entity;
   traversing, using the one more computing device processors, the graph database based on the set of parameter values for the first entity;
   determining, using the one more computing device processors, a first Boolean expression for satisfying a criterion for a first quota cell;
   determining, using the one more computing device processors, whether a first parameter value from the set of parameter values for the first entity matches the criterion for the first quota cell;
   in response to determining the first parameter value from the set of parameter values for the first entity matches the criterion for the first quota cell, determining, using the one more computing device processors, whether the first Boolean expression is completed, wherein in response to determining the first Boolean expression is not completed, determining, using the one more computing device processors, whether a second parameter value from the set of parameter values for the first entity matches the criterion for the first quota cell, or in response to determining the first Boolean expression is completed, determining, using the one more computing device processors, the first entity matches the first quota cell; and in response to determining the first parameter value from the set of parameter values for the first entity does not match the criterion for the first quota cell, not recording the first quota cell for the first entity.

2. The method of claim 1, further comprising determining a project for the first entity based on the first quota cell, or assigning the first entity to the project based on the first quota cell.

3. The method of claim 2, further comprising determining the project by weighted random selecting of projects according to priorities assigned to their respective quota cells identified for the first entity, wherein the first entity comprises a panelist.

4. The method of claim 3, wherein the weighted random selecting of projects according to the priorities assigned to their respective quota cells identified for the panelist includes associating the projects with segments of a segmented bell curve based on the priorities assigned to their respective quota cells identified for the panelist; and randomly selecting a segment of the bell curve.

5. The method of claim 4, wherein a segment associated with projects of higher priority than those of another segment has a greater chance of being selected than the other segment.

6. The method of claim 4, wherein the weighted random selecting of projects according to the priorities assigned to their respective quota cells identified for the panelist includes randomly selecting one of the projects of the selected segment of the bell curve.

7. The method of claim 1, wherein the first entity or the first quota cell comprises or is a panelist or a project.

8. The method of claim 1, wherein the criterion comprises include criterion and exclude criterion.

9. The method of claim 1, wherein determining the first parameter value from the set of parameter values for the first entity matches include criterion for the first quota cell is executed separately from determining the first parameter value from the set of parameter values for the first entity matches exclude criterion for the first quota cell.

10. The method of claim 1, wherein the first quota cell is associated with a priority.

11. The method of claim 1, further comprising assigning priorities to the quota cells based on at least one of: scarcity of quota cell criteria, percentage of progress of projects, or elapsed effective field time for completion of the projects.

12. The method of claim 11, wherein assigning the priorities based on the elapsed effective field time includes employing an effective field time factor that reflects the elapsed effective field time based on percentage of expiration of a predetermined amount of time for completing a particular project having a particular quota cell, or wherein assigning the priorities based on the percentage of progress includes employing the percentage of progress defined in terms of number of registered versus scheduled starts and/or completes for the quota cells.

13. The method of claim 1, further comprising assigning priorities to the quota cells, wherein assigning the priorities includes imposing limits on at least one of:
   a percentage of progress defined in terms of number of registered versus scheduled starts and/or completes for the quota cells, or
   a product of the percentage of progress and an effective field time factor that reflects an elapsed effective field time based on percentage of expiration of a predetermined amount of time for completing a particular project having a particular quota cell.

14. The method of claim 13, wherein assigning the priorities further includes summing a result of the imposing limits with a scarcity value reflecting a scarcity of criteria for the first quota cell.

15. The method of claim 14, wherein assigning the priorities further comprises scaling the result of the summing by a configurable tracker factor.

16. The method of claim 15, wherein assigning the priorities comprises computing a priority according to:

$$\text{Priority} = (\text{if}(450*(1.3\text{-Progress }\%)^2 > 700 \text{ then } 700 \text{ else if } 450*(1.3\text{-Progress }\%)^2*(\text{EFT Factor}) < 0 \text{ then } 0 \text{ else } 450*(1.3\text{-Progress }\%)^2*(\text{EFT Factor})) + (\text{scarcity value proxy}))*(\text{Tracker factor}).$$

17. The method of claim 1, further comprising selecting a quota cell, wherein selecting the quota cell further comprises weighted random selecting of the quota cells according to priorities assigned to the quota cells.

18. The method of claim 1, wherein the criterion comprises at least one: balancing criterion, wherein the balancing criterion is associated with balancing categories of first entities for a project, wherein in response to determining that parameter values associated with the first entity do not meet the balancing criterion, the first entity is not assigned to the project based on the first quota cell; or pacing criterion, wherein the pacing criterion comprises a threshold rate of filling the project, wherein in response to determining a current rate of filling the project is equal to or greater than the threshold rate, the first entity is not assigned to the project based on the first quota cell.

19. A method for matching entities to quota cells by evaluating Boolean expressions, the method comprising:
   accessing, using one more computing device processors, a graph database relating parameter values to quota cells;
   identifying, using the one more computing device processors, a set of parameter values for a first entity;
   traversing, using the one more computing device processors, the graph database based on the set of parameter values for the first entity;
   determining, using the one more computing device processors, a first Boolean expression for satisfying a criterion for a first quota cell;
   determining, using the one more computing device processors, whether a first parameter value from the set of parameter values for the first entity matches the criterion for the first quota cell;
   in response to determining the first parameter value from the set of parameter values for the first entity matches the criterion for the first quota cell, and in response determining the first Boolean expression is not completed, determining, using the one more computing device processors, whether a second parameter value from the set of parameter values for the first entity matches the criterion for the first quota cell;
   in response to determining the first parameter value from the set of parameter values for the first entity matches the criterion for the first quota cell, and in response determining the first Boolean expression is completed, recording, using the one more computing device processors, the first quota cell for the first entity;
   in response to determining the first parameter value from the set of parameter values for the first entity does not match the criterion for the first quota cell, and in response determining the first Boolean expression is completed, not recording the first quota cell for the first entity; and
   in response to determining the first parameter value from the set of parameter values for the first entity does not match the criterion for the first quota cell, and in response determining the first Boolean expression is not completed, not recording the first quota cell for the first entity.

20. The method of claim 19, further comprising determining a project for the first entity based on the first quota cell, or assigning the first entity to the project based on the first quota cell.

21. The method of claim 20, further comprising determining the project by weighted random selecting of projects according to priorities assigned to their respective quota cells identified for the first entity, wherein the first entity comprises a panelist.

22. The method of claim 21, wherein the weighted random selecting of projects according to the priorities assigned to their respective quota cells identified for the panelist includes associating the projects with segments of a segmented bell curve based on the priorities assigned to their respective quota cells identified for the panelist; and randomly selecting a segment of the bell curve.

23. The method of claim 22, wherein a segment associated with projects of higher priority than those of another segment has a greater chance of being selected than the other segment.

24. The method of claim 22, wherein the weighted random selecting of projects according to the priorities assigned to their respective quota cells identified for the panelist includes randomly selecting one of the projects of the selected segment of the bell curve.

25. The method of claim 19, wherein the first entity or the first quota cell comprises or is a panelist or a project.

26. The method of claim 19, wherein the criterion comprises include criterion and exclude criterion.

27. The method of claim 19, wherein determining the first parameter value from the set of parameter values for the first entity matches include criterion for the first quota cell is executed separately from determining the first parameter value from the set of parameter values for the first entity matches exclude criterion for the first quota cell.

28. The method of claim 19, wherein the first quota cell is associated with a priority.

29. The method of claim 19, further comprising assigning priorities to the quota cells based on at least one of: scarcity of quota cell criteria, percentage of progress of projects, or elapsed effective field time for completion of the projects.

30. The method of claim 29, wherein assigning the priorities based on the elapsed effective field time includes employing an effective field time factor that reflects the elapsed effective field time based on percentage of expiration of a predetermined amount of time for completing a particular project having a particular quota cell, or wherein assigning the priorities based on the percentage of progress includes employing the percentage of progress defined in terms of number of registered versus scheduled starts and/or completes for the quota cells.

31. The method of claim 19, further comprising assigning priorities to the quota cells, wherein assigning the priorities includes imposing limits on at least one of:
a percentage of progress defined in terms of number of registered versus scheduled starts and/or completes for the quota cells, or
a product of the percentage of progress and an effective field time factor that reflects an elapsed effective field time based on percentage of expiration of a predetermined amount of time for completing a particular project having a particular quota cell.

32. The method of claim 31, wherein assigning the priorities further includes summing a result of the imposing limits with a scarcity value reflecting a scarcity of criteria for the first quota cell.

33. The method of claim 32, wherein assigning the priorities further comprises scaling the result of the summing by a configurable tracker factor.

34. The method of claim 33, wherein assigning the priorities comprises computing a priority according to:

$$\text{Priority}=(\text{if}(450*(1.3-\text{Progress }\%)^2>700 \text{ then } 700 \\ \text{else if } 450*(1.3-\text{Progress }\%)^2*(\text{EFT Factor})<0 \\ \text{then } 0 \text{ else } 450*(1.3-\text{Progress }\%)^2*(\text{EFT Factor}))+(\text{scarcity value proxy}))*(\text{Tracker factor}).$$

35. The method of claim 19, further comprising selecting a quota cell, wherein selecting the quota cell further comprises weighted random selecting of the quota cells according to priorities assigned to the quota cells.

36. The method of claim 19, wherein the criterion comprises at least one: balancing criterion, wherein the balancing criterion is associated with balancing categories of first entities for a project, wherein in response to determining that parameter values associated with the first entity do not meet the balancing criterion, the first entity is not assigned to the project based on the first quota cell; or pacing criterion, wherein the pacing criterion comprises a threshold rate of filling the project, wherein in response to determining a current rate of filling the project is equal to or greater than the threshold rate, the first entity is not assigned to the project based on the first quota cell.

37. An apparatus for matching entities to quota cells by evaluating Boolean expressions, the apparatus comprising one or more computing device processors configured for:
accessing a graph database relating parameter values to quota cells;
identifying a set of parameter values for a first entity;
traversing the graph database based on the set of parameter values for the first entity;
determining a first Boolean expression for satisfying a criterion for a first quota cell;
determining whether a first parameter value from the set of parameter values for the first entity matches the criterion for the first quota cell;
in response to determining the first parameter value from the set of parameter values for the first entity matches the criterion for the first quota cell, determining whether the first Boolean expression is completed, wherein in response to determining the first Boolean expression is not completed, determining whether a second parameter value from the set of parameter values for the first entity matches the criterion for the first quota cell, or in response to determining the first Boolean expression is completed, determining the first entity matches the first quota cell; or in response to determining the first parameter value from the set of parameter values for the first entity does not match the criterion for the first quota cell, not recording the first quota cell for the first entity.

38. The apparatus of claim 37, wherein the one or more computing device processors are further configured for determining a project for the first entity based on the first quota cell, or assigning the first entity to the project based on the first quota cell.

39. The apparatus of claim 38, wherein the one or more computing device processors are further configured for determining the project by weighted random selecting of projects according to priorities assigned to their respective quota cells identified for the first entity, wherein the first entity comprises a panelist.

40. The apparatus of claim 39, wherein the weighted random selecting of projects according to the priorities assigned to their respective quota cells identified for the panelist includes associating the projects with segments of a segmented bell curve based on the priorities assigned to their respective quota cells identified for the panelist; and randomly selecting a segment of the bell curve.

41. The apparatus of claim 40, wherein a segment associated with projects of higher priority than those of another segment has a greater chance of being selected than the other segment.

42. The apparatus of claim 40, wherein the weighted random selecting of projects according to the priorities assigned to their respective quota cells identified for the panelist includes randomly selecting one of the projects of the selected segment of the bell curve.

43. The apparatus of claim 37, wherein the first entity or the first quota cell comprises or is a panelist or a project.

44. The apparatus of claim 37, wherein the criterion comprises include criterion and exclude criterion.

45. The apparatus of claim 37, wherein determining the first parameter value from the set of parameter values for the first entity matches include criterion for the first quota cell is executed separately from determining the first parameter value from the set of parameter values for the first entity matches exclude criterion for the first quota cell.

46. The apparatus of claim 37, wherein the first quota cell is associated with a priority.

47. The apparatus of claim 37, wherein the one or more computing device processors are further configured for assigning priorities to the quota cells based on at least one of: scarcity of quota cell criteria, percentage of progress of projects, or elapsed effective field time for completion of the projects.

48. The apparatus of claim 47, wherein assigning the priorities based on the elapsed effective field time includes employing an effective field time factor that reflects the elapsed effective field time based on percentage of expiration of a predetermined amount of time for completing a particular project having a particular quota cell, or wherein assigning the priorities based on the percentage of progress includes employing the percentage of progress defined in terms of number of registered versus scheduled starts and/or completes for the quota cells.

49. The apparatus of claim 37, wherein the one or more computing device processors are further configured for assigning priorities to the quota cells, wherein assigning the priorities includes imposing limits on at least one of:

a percentage of progress defined in terms of number of registered versus scheduled starts and/or completes for the quota cells, or a product of the percentage of progress and an effective field time factor that reflects an elapsed effective field time based on percentage of expiration of a predetermined amount of time for completing a particular project having a particular quota cell.

50. The apparatus of claim 49, wherein assigning the priorities further includes summing a result of the imposing limits with a scarcity value reflecting a scarcity of criteria for the first quota cell.

51. The apparatus of claim 50, wherein assigning the priorities further comprises scaling the result of the summing by a configurable tracker factor.

52. The apparatus of claim 51, wherein assigning the priorities comprises computing a priority according to:

Priority=(if(450*(1.3-Progress %)$^2$>700 then 700 else if 450*(1.3-Progress %)$^2$*(EFT Factor)<0 then 0 else 450*(1.3-Progress %)$^2$*(EFT Factor))+(scarcity value proxy))*(Tracker factor).

53. The apparatus of claim 37, wherein the one or more computing device processors are further configured for selecting a quota cell, wherein selecting the quota cell further comprises weighted random selecting of the quota cells according to priorities assigned to the quota cells.

54. The apparatus of claim 37, wherein the criterion comprises at least one: balancing criterion, wherein the balancing criterion is associated with balancing categories of first entities for a project, wherein in response to determining that parameter values associated with the first entity do not meet the balancing criterion, the first entity is not assigned to the project based on the first quota cell; or pacing criterion, wherein the pacing criterion comprises a threshold rate of filling the project, wherein in response to determining a current rate of filling the project is equal to or greater than the threshold rate, the first entity is not assigned to the project based on the first quota cell.

* * * * *